United States Patent Office 3,783,102
Patented Jan. 1, 1974

3,783,102
PRODUCTION OF L-ASPARAGINASE
Donald Sidney Callow, Brian John Capel, and Charles Gervase Thorngate Evans, Salisbury, England, assignors to Secretary of State for Social Services in Her Britannic Majesty's Government of the United Kingdom of Great Britain and Northern Ireland, London, England
No Drawing. Filed Nov. 11, 1971, Ser. No. 197,924
Claims priority, application Great Britain, Nov. 13, 1970, 54,277/70
Int. Cl. C12d 13/10
U.S. Cl. 195—66 A
14 Claims

ABSTRACT OF THE DISCLOSURE

The enzyme L-asparaginase, which is therapeutically active against certain types of leukemia and disseminated cancers, may be produced in high yield by growing bacteria of the genus Erwinia in continuous culture in a limited steady state concentration of certain Krebs cycle intermediates and their precursors.

---

This invention relates to improvements in the production of the enzyme L-asparaginase.

U.S. Pat. No. 3,686,072 discloses that a therapeutically active L-asparaginase may be isolated from bacteria of the genus Erwina, a known genus pathogenic towards plants. The bacteria may be grown on or in a variety of solid or liquid culture media, both simple chemically defined media and in complex media, and examples are described in which batch-wise production of Erwini in complex media gives rise to yields of L-asparaginase of 8.2 IU/ml. of culture, and continuous culture in complex media gives yields of 24 IU/ml. of culture.

U. S. patent application Ser. No. 333,793, filed Feb. 26, 1973 discloses that higher yields of L-asparaginases/ml. culture may be obtained by supplementing the culture medium, either for batch or continuous culture with active proportions of at least one of the amino acids—glutamic acid, serine, threonine or aspartic acid. Examples are described in which yields of L-asparaginase of 44.5 IU/ml. of culture are obtained in batch culture and up to 80 IU/ml. of culture are obtained in continuous culture.

We have now discovered that in selected conditions for continuous culture even higher yields of L-asparaginase/ml. of culture may be obtained.

According to the present invention a process for the production of L-asparaginase comprises growing bacteria of the genus Erwinia in continuous culture in a limited steady state concentration of a choosen carbon source which is a Kreb's cycle intermediate or a precursor thereof under the process conditions. Suitable carbon source include glycerol, glucose, mannitol, lactate and citrate and other precursors which can lead to Kreb's cycle intermediates. Glycerol or glucose are normally to be preferred as inexpensive carbon sources offering good yields of L-asparaginase. The effectiveness of the chosen carbon sources in continuous culture is surprising since these materials are found to induce varying degrees of inhibition of enzyme production in batch culture.

L-asparaginase may then be extracted from the culture by any convenient cell disruption methods, but preferably by processes fully described in U.S. Pat. No. 3,660,238.

In process in accordance with the invention the nutrient culture may be based either on simple salts, media in which the chosen carbon source provides substantially all of the carbon available to the bacteria, or in complex media in which the chosen carbon source may supplement any other carbon source already present in the media.

Whilst nutrient media containing a mixture of two or more of the chosen carbon sources may be used in processes in accordance with the present invention, it is preferable that only one of the chosen carbon sources should be available to the bacterial culture at any particular stage of the continuous culture.

Processes in accordance with the present invention may be applied to all bacteria of the Erwinia genus, particularly those strains set out in U.S. Pat. 3,686,072. It is particularly usefully applied to a strain of Erwinia carotovora deposited with the National Collection of Plant Pathogenic Bacteria, England under NCPPB 1066, which has a high specific activity, i.e. ratio of enzyme activity to mg. of protein produced.

Continuous culture processes in accordance with the present invention are normally carried out at a pH of between 5.5 and 8.0 preferably 6.5 to 7.5 and temperature of 20° to 40° C., preferably 28° to 38° C. The dilution rate is normally 0.05 to 0.4, preferably 0.1 to 0.3 where dilution rate is the ratio of the amount of liquid passed through the culture vessel per hour to the volume of liquid contained by the culture vessel. At these dilution rates, the concentration of the chosen carbon source in the culture medium supplied is 0.5 to 5%, preferably 1%–3%, by wgt./vol. so that the limited steady state concentration in the culture vessel must be less than about 0.1 mg./ml. (preferably less than 0.05 mg./ml.) and insufficient to repress the formation of L-asparaginase which may occur at higher concentrations.

Some examples of continuous culture processes in accordance with the present invention will now be described:

EXAMPLE 1

A single colony of Erwinia carotovora (NCPPB 1066 S10) was taken from a place of Oxiod plate count agar into 4 ml. Tryptic meat broth and incubated at 37° C. for 6 hrs. 1 ml. of this is then added to 100 mls. of medium A in a 500 ml. conical flask. Medium A has the following constitution:

| | | |
|---|---|---|
| $NaH_2PO_4$ | mM | 100 |
| $NH_4Cl$ | mM | 100 |
| KCl | mM | 5 |
| $Na_2SO_4$ | mM | 10 |
| Citric acid | mM | 2 |
| $Zn^{2+}$ | mM | 0.025 |
| $Fe^{3+}$ | mM | 0.1 |
| Mm | mM | 0.05 |
| Cu | mM | 0.005 |
| Co | mM | 0.01 |
| B | mM | 0.005 |
| Mg | mM | 1.25 |
| Ca | mM | 0.1 |
| Mo | mM | 0.01 |
| Glycerol | percent w./v. | 1 |
| pH—7. | | |

This suspension is incubated for 18 hrs. at 37° on a rotary shaker and is added to a 3 litre Portion Fermenter as described by Elsworth, Meakin, Pitt and Capel J. Appl. Bact. 1956 19 262–278 containing 3 litres of a medium consisting of 50 g./litre. Yeatex(light grade) (Product of the English Grains Co Ltd) 2 mM. citric acid and 1.5% w./v. glycerol. Air was provided at ½ vol/vol/minute and the stirrer speed set at 1100 r.p.m. The culture was allowed to grow batch-wise for 8 hrs., and then flow of the specified medium was commenced for continuous culture at a pH of 7.0 and temperature of 37° C. and at a dilution rate of 0.14 h.$^{-1}$. After 7 days culture, the average production of L-asparaginase for the subsequent 8 days was 178 IU/ml. of culture (The maximum was 210 IU/ml. and the minimum 143 IU/ml.). The average dry weight of cells was 8.0 mg./ml.

EXAMPLE 2

Seed was produced as in the previous example and was added to 900 ml. of production medium in a 1 liter Portion Fermenter. (Production medium is the same as medium A but with $NaH_2PO_4$ reduced to 20 mm. and glycerol increased to 2% w./v.). Air was supplied at ½ vol./vol./min. and the stirrer speed set at 750 r.p.m.

The culture was grown batch-wise for 9½ hrs. and then placed on flow for continuous culture at a pH of 7.0, temperature of 37° C. and dilution rate of 0.10 h.$^{-1}$. After 40 days, the average production of L-asparaginase for the subsequent 6 days was 113 IU/ml. of culture. (The maximum was 119 IU/ml. and the minium 105 IU/ml.). The average dry weight of cells was 8.2 mg./ml.

EXAMPLE 3

A continuous culture of *Erwinia carotovora* (NCPPB 1066 S10) was established by a procedure similar to Example 1 in a simple salts medium (Medium A but $$Na_2H_2PO_4$$

reduced to 20 mm. and containing 1% w./v. of a chosen carbon source which was either glycerol, mannitol or citric acid). Culture medium having the same constitution was continuously supplied to the culture at a dilution rate of 0.2 hr.$^{-1}$. The temperature was 37° C. and the pH maintained at 7.0.

The results can be summarized as follows:

| | L-asparaginase titer (IU/ml. culture) | Cell dry weight (mg./ml.) | Specific activity |
|---|---|---|---|
| Carbon source: | | | |
| Glycerol | 84 | 4.0 | 30 |
| Citric acid | 38 | 2.1 | 26 |
| Mannitol | 10 | 4.2 | 3.4 |

EXAMPLE 4

The effect of varying dilution rate and the concentration of carbon source was demonstrated by establishing a continuous culture of *Erwinia carotovora* on complex medium as in Example 1 using two levels of glycerol concentration and two dilution rates. The results were as follows.

| | L-asparaginase titer (IU/ml.) | | |
|---|---|---|---|
| | 1.5% glycerol | 1.75% glycerol | Dilution rate (hr.$^{-1}$) |
| Length of culture (days): | | | |
| 1-4 | 2 | 2 | 0.28 |
| 5 | 197 | 161 | 0.15 |
| 6-10 | 128 | 99 | 0.15 |
| 11-15 | 104 | 80 | 0.15 |
| 16-20 | 100 | 78 | 0.15 |

It can be seen that the high dilution rate of 0.28 provides a glycerol level in the culture which exceeds what can be completely utilized so that L-asparaginase production is repressed to a level of 2 IU/ml. culture. Although this titer is relatively low it is nevertheles sof the same order as some typical published batch culture processes. For example, Peterson and Ciegler (App. Microbial., vol. 18, 1969) obtained a yield of 1.35 IU/ml. from a batch culture of *Erwinia aroideae*.

EXAMPLE 5

The process of Example 1 was repeated using a concentration of a chosen carbon source, glucose, in place of glycerol at a level of 1.5% w./v. The L-asparaginase titer and the specific activity of the culture were substantially identical to that obtained in Example 1.

EXAMPLE 6

The process of Example 1 was repeated using a high dilution rate of 0.254 and glycerol level in the culture and continuously supplied medium at 1.5% w./v. giving the steady state concentration in the culture at 0.01 mg./ml. The enzyme titer was 110 IU/ml.

We claim:

1. A process for the production of L-asparaginase which comprises growing bacteria of the genus Erwinia in continuous culture in a limited steady state concentration of up to 0.1 mg./ml. of a chosen carbon source which is a Krebs cycle intermediate or a precursor thereof under the process conditions.

2. A process according to claim 1 wherein the chosen carbon source is glycerol.

3. A process according to claim 1 wherein the chosen carbon source is glucose.

4. A process according to claim 1 wherein the chosen carbon source is citric acid or a citrate.

5. A process according to claim 1 wherein the chosen carbon source is lactic acid or lactate.

6. A process according to claim 1 wherein the chosen carbon source is mannitol.

7. A process according to claim 1 wherein the limited steady state concentration is up to 0.05 mg./ml.

8. A process according to claim 1 in which the limited steady state concentration in the culture is achieved by continuously supplying culture medium containing between about 0.5 to 5% wgt./vol. of the chosen carbon source at a dilution rate of between about 0.05 and 0.4 per hour.

9. A process according to claim 8 wherein the continuously-supplied culture medium contains 1%-3% wgt./vol. of the chosen carbon source and the dilution rate is between 0.1 to 0.3 per hour.

10. A process according to claim 1 wherein the pH of the continuous culture is between about 5.5 and 8.0.

11. A process according to claim 10 wherein the pH is between 6.5 and 7.5.

12. A process according to claim 1 in which the temperature is maintained between about 20° C. and 40° C.

13. A process according to claim 12 wherein the temperature is maintained between 28° C. and 38° C.

14. A process according claim 1 wherein the bacteria are of the species *Erwinia carotovora*.

References Cited
UNITED STATES PATENTS

| 3,686,072 | 8/1972 | Herbert et al. | 195—66 A X |
| 3,660,238 | 5/1972 | Wade | 195—66 A |
| 3,528,887 | 9/1970 | Robison. | |

LIONEL M. SHAPIRO, Primary Examiner

UNITED STATES PATENT OFFICE
CERTIFICATE OF CORRECTION

PATENT NO. : 3,783,102
DATED : JANUARY 1, 1974
INVENTOR(S) : DONALD SIDNEY CALLOW et al

It is certified that error appears in the above—identified patent and that said Letters Patent are hereby corrected as shown below:

Column 1, line 28, change "Erwina" to --- Erwinia ---.

Column 1, line 32, change "Erwini" to --- Erwinia ---.

Column 1, line 53, change "source" to --- sources ---.

Column 2, line 35, change "place" to --- plate ---.

Column 2, line 47, change "Mm" to --- Mn ---.

Column 3, line 5, change "mm" to --- mM ---.

Column 3, line 23, change "mm" to --- mM ---.

Signed and sealed this 27th day of May 1975.

(SEAL)
Attest:

RUTH C. MASON
Attesting Officer

C. MARSHALL DANN
Commissioner of Patents
and Trademarks